(12) United States Patent
Parfondry et al.

(10) Patent No.: US 6,774,153 B2
(45) Date of Patent: Aug. 10, 2004

(54) PROCESS FOR PREPARING A FREE RISE OR SLABSTOCK FLEXIBLE POLYURETHANE FOAM

(75) Inventors: Alain Parfondry, Brussels (BE); Jianming Yu, Brussels (BE)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/191,371

(22) Filed: Jul. 1, 2002

(65) Prior Publication Data

US 2003/0087978 A1 May 8, 2003

Related U.S. Application Data

(63) Continuation of application No. PCT/EP00/12212, filed on Dec. 5, 2000.

(30) Foreign Application Priority Data

Jan. 17, 2000 (EP) .............................................. 00100809

(51) Int. Cl.$^7$ .............................................. C08G 18/48
(52) U.S. Cl. ....................... 521/130; 521/133; 521/137; 521/160; 521/174; 521/904
(58) Field of Search ................................. 521/130, 133, 521/137, 160, 174, 904

(56) References Cited

U.S. PATENT DOCUMENTS

| | | | |
|---|---|---|---|
| 4,374,209 A | | 2/1983 | Rowlands |
| 4,452,923 A | | 6/1984 | Carroll et al. |
| 4,945,117 A | | 7/1990 | Gansen et al. |
| 5,134,172 A | * | 7/1992 | Bruyninckx et al. ........ 521/137 |
| 5,369,138 A | * | 11/1994 | Gansen ........................ 521/159 |
| 5,521,226 A | * | 5/1996 | Bleys .......................... 521/174 |
| 5,977,198 A | | 11/1999 | Hettel et al. |
| 6,417,241 B1 | * | 7/2002 | Huygens et al. ............. 521/137 |

FOREIGN PATENT DOCUMENTS

| | | |
|---|---|---|
| DE | 2 263 205 | 7/1974 |
| EP | 0 111 121 | 6/1984 |
| EP | 0 263 280 | 4/1988 |
| EP | 0 296 449 | 12/1988 |
| EP | 0 339 369 | 11/1989 |
| EP | 0 392 788 | 10/1990 |
| EP | 0 418 039 | 3/1991 |
| EP | 0 439 792 | 8/1991 |
| EP | 0 554 721 | 8/1993 |
| EP | 0 555 721 | 8/1993 |
| EP | 0 555 742 | 8/1993 |
| EP | 0 566 251 | 10/1993 |
| EP | 0 676 434 | 10/1995 |
| EP | 0 679 671 | 11/1995 |
| EP | 0 694 570 | 1/1996 |
| EP | 0 712 876 | 5/1996 |
| EP | 0 731 120 | 9/1996 |
| EP | 0 733 078 | 9/1996 |
| EP | 0 733 654 | 9/1996 |
| EP | 0 755 955 | 1/1997 |
| EP | 0 845 485 | 6/1998 |
| EP | 0 884 338 | 12/1998 |
| EP | 0 903 362 | 3/1999 |
| GB | 2072204 | 9/1981 |
| JP | 8-176256 | 7/1996 |
| JP | 9-31153 | 2/1997 |
| JP | 9-263621 | 10/1997 |
| JP | 11-255875 | 9/1999 |
| WO | WO 94 12533 | 6/1994 |
| WO | WO 94/24183 | 10/1994 |
| WO | WO 95 34590 | 12/1995 |
| WO | WO 97 19971 | 6/1997 |
| WO | WO 98 42763 | 10/1998 |

* cited by examiner

*Primary Examiner*—John M. Cooney, Jr.
(74) *Attorney, Agent, or Firm*—Nicole Graham

(57) ABSTRACT

Process for making free rise or slabstock flexible polyurethane foams with high resilience using diphenylmethane diisocyanate and a polyol composition comprising: (a) a polyoxyethylene-polyoxypropylene-polyol, having an average nominal hydroxyl functionality of 2–8, an average equivalent weight of 1000–4000 and containing 10–25% by weight of oxyethylene groups; (b) 3 to 8 parts by weight of water as the sole blowing agent or optionally together with $CO_2$ as the sole blowing agents; and (c) 2 to 20, preferably 2 to 10 parts by weight of a polyether polyol having an average nominal hydroxyl functionality of 2–6, an average equivalent weight of 200–600 and containing at least 60% by weight of oxyethylene groups; and optionally (d) up to 30 and preferably 2–25 parts by weight of particulate material which is dispersed in said polyol composition; the amounts of (b)(ii) to (b)(iv) being calculated per 100 parts by weight of (b)(i); and optionally (e) auxiliaries and additives.

18 Claims, No Drawings

PROCESS FOR PREPARING A FREE RISE OR SLABSTOCK FLEXIBLE POLYURETHANE FOAM

CROSS REFERENCE TO RELATED APPLICATIONS

This application is a continuation of international application PCT EP00/12212, filed Dec. 5, 2000.

FIELD OF THE INVENTION

The present invention relates to a process for preparing flexible polyurethane foams.

BACKGROUND OF THE INVENTION

It is widely known to prepare flexible polyurethane foams by reacting an organic polyisocyanate and a high molecular weight isocyanate-reactive compound in the presence of a blowing agent. It is also known to prepare flexible polyurethane foams from a polyisocyanate composition comprising a semi-prepolymer.

Although useful flexible foams based on diphenylmethane diisocyanate (MDI) are obtainable, such foams still have several deficiencies. In particular, foams made by the slabstock process need to have improved stability at low density, while retaining their foam strength (tear), resilience (ball rebound), and creep resistance (compression set). Some of these improvements can be obtained by using tolylene diisocyanate (TDI) instead of MDI. Such foams show a high resilience and good foam strength at low density. However, due to its vapour pressure and toxicity, special measures need to be taken to handle TDI. Further, TDI-based foams show relatively low hardness, especially at low density, as well as a slow cure and narrow processing range (isocyanate index).

Therefore, there is a need for flexible foams that have a reduced density, while the other physical properties of the foam, including, elongation, tear strength, dry compression set, and resilience are maintained or even improved. Surprisingly, it has been found that the foregoing may be achieved by the process of the present invention.

SUMMARY OF THE INVENTION

The present invention is concerned with a process for preparing a free rise or slabstock flexible polyurethane foam at an NCO index of 70–120 by reacting:

(a) a polyisocyanate composition consisting of diphenylmethane diisocyanate and homologues thereof having an isocyanate functionality of 3 or more, the amount of diphenylmethane diiusocyanate being 81 to 100% by weight and preferably 90 to 100% by weight calculated on the amount of diphenylmethane diisocyanates and homologues, and the diphenylmethane diisocyanate comprising 40–60% by weight, calculated on the weight of this diphenylmethane diisocyanate, of diphenylmethane diisocyanate containing at least one NCO group in the ortho position, and the amount of homologues having an isocyanate functionality of 3 or more being 19–0% by weight and preferably 10–0% by weight, and (b) a polyol composition comprising:

(i) a polyoxyethylene-polyoxypropylene-polyol, having an average nominal hydroxyl functionality of 2–8, an average equivalent weight of 1000–4000 and preferably of 1000–3000 and containing 10–25% by weight of oxyethylene groups;

(ii) 3 to 8 parts by weight of water as the sole blowing agent or optionally together with $CO_2$ as the sole blowing agents; and (iii) 2 to 20, preferably 2 to 15 parts by weight of a polyether polyol having an average nominal hydroxyl functionality of 2–6, an average equivalent weight of 200–600 and containing at least 60% by weight of oxyethylene groups; and optionally (iv) up to 30 and preferably 2–25 parts by weight of particulate material which is dispersed in said polyol composition; the amounts of (b)(ii) to (b)(iv) being calculated per 100 parts by weight of (b)(i); and optionally (v) auxiliaries and additives.

DETAILED DESCRIPTION OF THE INVENTION

In the context of the present application, the following terms have the following meaning:

1) Isocyanate index or NCO index or index:

the ratio of NCO-groups over isocyanate-reactive hydrogen atoms present in a formulation, given as a percentage:

$$\frac{[NCO] \times 100 \, (\%)}{[\text{active hydrogen}]}$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce the semi-prepolymer or other modified polyisocyanates or any active hydrogens reacted with isocyanate to produce modified polyols or polyamines, are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water. This means that for the purpose of calculating the isocyanate index at the actual foaming process one hydroxyl group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using water as reactive foaming agent (involving a reaction of water with isocyanate groups yielding urea linkages and carbon dioxide and producing polyureaurethane foams).

5) The term "average nominal hydroxyl functionality" is used herein to indicate the number average functionality (number of hydroxyl groups per molecule) of the polyol composition on the assumption that this is the number average functionality (number of active hydrogen atoms per molecule) of the initiator(s) used in their preparation although in practice it will often be somewhat less because of some terminal unsaturation. The term "equivalent weight" refers to the molecular weight divided by this average nominal hydroxyl functionality.

6) The word "average" refers to number average.

7) The wording "one shot", "prepolymer" or "quasi-prepolymer" refer to commonly known ways of reacting the ingredients to prepare the foam wherein all polyol is reacted with polyisocyanate in the presence of water (one-shot) or wherein all polyol is prereacted with excess polyisocyanate in the absence of water (prepolymer) or wherein part of polyol is prereacted with excess polyisocyanate in the absence of water (quasi-prepolymer).

The present invention is concerned with a process for preparing a free rise or slabstock flexible polyurethane foam at an NCO index of 70–120 by reacting:

(a) a polyisocyanate composition consisting of diphenylmethane diisocyanate and homologues thereof having an isocyanate functionality of 3 or more, the amount of diphenylmethane diisocyanate being 81 to 100% by weight and preferably 90 to 100% by weight calculated on the amount of diphenylmethane diisocyanates and homologues, and the diphenylmethane diisocyanate comprising 40–60% by weight, calculated on the weight of this diphenylmethane diisocyanate, of diphenylmethane diisocyanate containing at least one NCO group in the ortho position, and the amount of homologues having an isocyanate functionality of 3 or more being 19–0% by weight and preferably 10–0% by weight, and (b) a polyol composition comprising:

(i) a polyoxyethylene-polyoxypropylene-polyol, having an average nominal hydroxyl functionality of 2–8, an average equivalent weight of 1000–4000 and preferably of 1000–3000 and containing 10–25% by weight of oxyethylene groups;

(ii) 3 to 8 parts by weight of water as the sole blowing agent or optionally together with $CO_2$ as the sole blowing agents; and (iii) 2 to 20, preferably 2 to 15 parts by weight of a polyether polyol having an average nominal hydroxyl functionality of 2–6, an average equivalent weight of 200–600 and containing at least 60% by weight of oxyethylene groups; and optionally (iv) up to 30 and preferably 2–25 parts by weight of particulate material which is dispersed in said polyol composition; the amounts of (b)(ii) to (b)(iv) being calculated per 100 parts by weight of (b)(i); and optionally (v) auxiliaries and additives.

The diphenylmethane diisocyanate (MDI) used may be selected from isomeric mixtures of 4,4'-MDI and 2,4'-MDI and less than 10% by weight of 2,2'-MDI having the aforementioned amount of 40–60% by weight of 2,4'-MDI and 2,2'-MDI. The homologues having an isocyanate functionality of 3 or more are contained in so-called polymeric or crude MDI. Polymeric or crude MDI comprise MDI and homologues having an isocyanate functionality of 3 or more and are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in such crude or polymeric MDI compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the average isocyanate functionality preferably ranges from 2.3–2.8. The NCO value of these polymeric or crude MDIs is at least 30% by weight. The polymeric or crude MDI contain diphenylmethane diisocyanate, the remainder being polymethylene polyphenylene polyisocyanates of functionality greater than two together with by-products formed in the manufacture of such polyisocyanates by phosgenation.

The polyisocyanate compositions used in the process according to the present invention and which contain homologues are made by mixing an appropriate amount of MDI and polymeric or crude MDI. For example such polyisocyanates may be made by mixing SUPRASEC® MI 50 isocyanate, containing about 50% by weight of 4,4'-MDI and about 50% by weight of 2,4'-MDI and 2,2'-MDI and a polymeric MDI having an NCO value of 30.7% by weight; comprising about 38% by weight of diisocyanate, the remainder being homologues having an isocyanate functionality of 3 or more; 6% by weight of the diisocyanates being 2,4'- and 2,2'-MDI (SUPRASEC is a trademark of Huntsman International LLC). Per 100 parts by weight of polyisocyanate composition the amount of SUPRASEC MI 50 isocyanate would be about 70–100 parts and preferably about 80–100 parts by weight and the amount of this polymeric MDI would be about 30–0 parts and preferably about 20–0 parts by weight. It is to be noted that the polymeric or crude MDI may contain 2,4'-MDI and 2,2'-MDI and that the range of ortho NCO substituted MDI in the diphenylmethane diisocyanate in polyisocyanate composition a) is the totality of the 2,2'- and 2,4'-MDI in the MDI and in the polymeric or crude MDI. The isocyanate functionality is preferably below 2.15, more preferably at most 2.10, and most preferably at most 2.07. The amount of diisocyanate containing at least one NCO group in the ortho position is preferably at least 45% by weight calculated on all diiusocyanate. No other polyisocyanates are used in the process according to the present invention.

The total amount of polymeric or crude MDI used to prepare the polyisocyanate composition should be such that the amount of diphenylmethane diisocyanate and the amount of ortho-substituted diisocyanate remains within the ranges given above. Those skilled in the art will be able to calculate the amount easily depending on the chosen MDI and the polymeric or crude MDI, certainly in the light of the examples and in view of the above explanation. The polyisocyanate composition is made by simple mixing of the MDI and the crude or polymeric MDI in any order.

For (b)(i), polyether polyols that may be used include products obtained by the polymerisation of ethylene oxide and propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, cyclohexane diamine, cyclohexane dimethanol, glycerol, trimethylolpropane, 1,2,6-hexanetriol, pentaerythritol, sorbitol and sucrose. Mixtures of initiators and/or cyclic oxides may be used.

The polyoxyethylene-polyoxypropylene polyols are obtained by the simultaneous or sequential addition of ethylene and propylene oxides to initiators as fully described in the prior art. Random copolymers, block copolymers and combinations thereof may be used having the indicated amount of oxyethylene groups in particular those having at least part and preferably all of the oxyethylene groups at the end of the polymer chain (capped or tipped). Mixtures of the said polyols can be particularly useful. Preferred polyols have an average molecular weight of 3000–15000.

During the last years several methods have been described to prepare polyether polyols having a low level of unsaturation. These developments have made it possible to use polyether polyols at the higher end of the molecular weight range since much polyols can now be prepared with an acceptably low level of unsaturation. According to the present invention polyols having a low level of unsaturation may be used as well. In particular such high molecular weight polyols having a low level of unsaturation may be used for preparing flexible foams having a high ball rebound.

Water is used as sole blowing agent or together with $CO_2$. Preferably the amount of water is 4–8 parts by weight per 100 parts by weight of polyol (b)(i). The $CO_2$ may be added in the gaseous, the liquid or the supercritical state to the polyisocyanate composition or the polyol composition or to the mixing head or mixing device where these compositions are mixed. The amount of $CO_2$ is such so as to obtain foams having the density as described hereinafter.

The polyols (b)(iii) used in polyol composition (b) may be selected from the polyether polyol mentioned for (b)(i) with the proviso that the equivalent weight is 200–600 and the oxyethylene content is at least 60% by weight. Most preferred polyols are polyoxyethylene polyols having an equivalent weight of 200–500, especially 200–450.

The particule material is any material present as a dispersion in the polyol. This material is usually a polymeric material. The polyol is a polymer-modified polyol. Various embodiments are known. For example, SAN-modified polyols can be used. Preferably, the polymer-modified polyol is a polyisocyanate polyaddition (PIPA) polyol.

Preferably, the particulate material (b)(iv) is the reaction product of a compound having a plurality of hydroxyl-, primary amine- and/or secondary amine groups and having an equivalent weight of up to 400 and preferably of up to 200 (hereinafter called coreactant) and a polyisocyanate and which is dispersed in a polyol. Such polyol dispersion is generally known as such in the art. They are often referred to as a PIPA polyol. Such PIPA polyols have been described in the prior art extensively (e.g. GB 2072204, U.S. Pat. No. 4,452,923, EP 418039 and WO 94/12533). Such PIPA polyols are commercially available (e.g. DALTOCEL F 417 polyol from Huntsman Polyurethanes. DALTOCEL is a trademark of Huntsman ICI Chemicals LLC.). The particulate material which is the reaction product of a polyisocyanate and the coreactant may be prepared in ways described in the above prior art. The content of particulate materials may vary within the disclosed ranges.

Usually the particulate material is prepared in polyol (b)(i) by adding the coreactant to polyol (b)(i) followed by the addition of the polyisocyanate. The amount of coreactant and polyisocyanate depends on the desired amount of particulate material dispersed in the polyol. If desired, loadings of the dispersed material higher than those specified hereinbefore may be made followed by dilution with polyol (b)(i) to the desired amount.

When desired, special addition schemes of the coreactant and the polyisocyanate may be employed as disclosed in EP 418039 and WO 94/125333. The relative amount of coreactant and polyisocyanate is generally chosen in such a way that the number of hydrogen atoms in the coreactant capable of reacting with the polyisocyanate exceeds the number of isocyanate groups.

The polyisocyanate used in making the particulate material is any organic compound having at least two, preferably 2 to 4 isocyanate groups per molecule. The polyisocyanate may be aliphatic, aromatic or cycloaliphatic, although aromatic types are preferred due to their desirable properties and reactivity. Representative of these types are diisocyanates such as m- or p-phenyl diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphtylene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylene-diisocyanate and 3,3'-dimethyldiphenylpropane-4,4'-diisocyanate; triisocyanates such as toluene-2,4,6-triisocyanate and tetraisocyanates such as 4,4'-dimethyldiphenylmethane-2,2', 5,5'-tetraisocyanate, and other polyisocyanates such as the diverse polymethylene-polyphenylene-polyisocyanates (polymeric or crude MDI) and mixtures of these polyisocyanates. Most preferred polyisocyanates used are diphenylmethane diisocyanate optionally comprising homologues thereof having an isocyanate functionality of 3 or more, toluene-diisocyanate and mixtures thereof.

The coreactant is a material having a plurality of —OH, >NH and/or —$NH_2$ groups and an equivalent weight per active hydrogen atom of up to 400, preferably up to 200. Since the coreactant reacts with the polyisocyanate in situ in the polyol, it is also preferred that the coreactant be more reactive with the polyisocyanate than the polyol. Preferred coreactants are alkanolamines, low equivalent weight amine-initiated polyether polyols, alkylene oxide, acrylonitrile, or acrylic ester adducts of amines, primary amines, secondary amines, hydrazines, dihydrazides, urea, ammonia, Mannich condensates, low equivalent weight hydroxyl-terminated compounds such as ethylene glycol, glycerine, glycol ethers, pentaerythritol, aminobenzenes, or mixtures thereof. Of these, the alkanolamines are most preferred.

Suitable alkanolamines include mono-, di- and trialkanolamines, particularly those wherein the alkanol groups have from 2 to 6, preferably 2 to 3 carbon atoms. The mono- and dialkanolamines may also have a single N-alkyl substituent, preferably having from 1 to 6 carbon atoms. Preferred among these are monoethanolamine, diethanolamine, triethanolamine, N-methylethanolamine, N-ethylethanolamine, N-butylethanolamine, N-methyldiethanolamine, diisopropanolamine, triisopropanolamine, N-methylisopropanolamine, N-ethylisopropanolamine, and N-propylisopropanolamine.

Suitable primary and/or secondary amines include polyhydric aliphatic, arylaliphatic, cycloaliphatic and aromatic amines including, for example, ethylene diamine, 1,2- and 1,3-propylene diamine, tetramethylene diamine, hexamethylene diamine, dodecamethylene diamine, trimethyldiaminohexane, N,N'-dimethylethylenediamine, higher homologues of ethylene diamine such as diethylene triamine, triethylenetetramine and tetraethylenepentamine, homologues of propylene diamine, 4-aminobenzylamine, 4-aminophenylethylamine, piperazine, N,N'-bisaminoethyldipropylene triamine, and 1-amino-3,3,5-trimethyl-5-aminomethylcyclohexane.

Suitable hydrazines include hydrazine itself and mono-substituted or N,N'-disubstitued hydrazines having substituent groups such as $C_1$–$C_6$ alkyl, cyclohexyl or phenyl groups. Hydrazine itself is preferred among these.

Suitable hydrazides include the hydrazides of multifunctional carboxylic acids such as carbonic acid, oxalic acid, malonic acid, succinic acid, adipic acid, sebacic acid, azelaic acid, maleic acid, fumaric acid, phthalic acid, isophthalic acid and terephthalic acid, and the esters of a hydrazine monocarboxylic acid with dihydric or polyhydric alcohols and phenols. These hydrazides preferably have a molecular weight of from 90 to 1000.

The reactants are advantageously mixed at any temperature at which the mixture is a liquid and at which the reactants do not degrade, but are preferably mixed at 0 to 170° C., more preferably 15 to 100° C. The isocyanate and coreactant are advantageously mixed with stirring, in order to promote the formation of a plurality of small particles. Usually, rapid agitation is desired to optimize particle size and minimize the viscosity of the resulting dispersion. The process can be conducted batch-wise or continuously, as described in U.S. Pat. No. 4,374,209.

The reaction between the polyisocyanate and the coreactant is often exothermic, and proceeds rapidly, being essentially completed in most cases in 1 minute to 3 hours, preferably 1 to 30 minutes, although this depends somewhat on the choice of polyisocyanate and coreactant, the batch size, and initial temperature. Agitation is preferably effected throughout the reaction period.

If desired, a catalyst for the reaction between the polyisocyanate and the coreactant may be used to accelerate the reaction. Suitable catalysts include these described below with respect to the use of this dispersion to prepare polyurethanes, with the organotin catalysts being preferred. The amount of catalyst is advantageously up to 1 weight percent based on polyol, preferably up to 0.1 weight percent and more preferably up to 0.05 weight percent. However, the catalyst may not be necessary, particularly with the more reactive coreactants.

Once the polyol with the dispersed particulate material has been prepared the polyol composition (b) is prepared by adding the water and polyol (b)(iii) and mixing. Although not preferred, the constituents of the polyol composition may be led to the mixing device where they are combined with the polyisocyanate independently from each other.

It will be appreciated that the PIPA polyol is typically of the same nature of polyol (b)(i); these two polyols may be different or identical. Polyol (b)(i) may thus be a mixture, as will be understood by one skilled in the art.

To this polyol composition (b), additives and auxiliaries known per se may be added, such as catalysts, which enhance the formation of urethane and urea bonds (e.g. tertiary amine and organo tin catalysts), chain extenders and cross-linkers having an equivalent weight of 31 to less than 200 and having 2–8 isocyanate-reactive hydrogen atoms (e.g. ethanolamine, diethanolamine, triethanolamine, ethylene glycol, diethylene glycol, triethylene glycol, propylene glycol, dipropylene glycol, butanediol, glycerol, trimethylolpropane, pentaerythritol, sorbitol, sucrose, polyethylene glycol having a molecular weight less than 400, toluene diamine, diethyl toluene diamine, cyclohexane diamine, phenylene diamine, diphenylmethane diamine, alkylated diphenylmethane diamine and ethylene diamine), surfactants, stabilizers, flame retardants, fillers, anti-oxidants, anti-microbial agents and colorants. Preferably, cross-linkers having 3 or more isocyanate-reactive hydrogen atoms and an equivalent weight of less than 200 are not used.

The foams are made by combining and mixing the polyisocyanate and polyol compositions (a) and (b) and allowing the mixture to react. The relative amounts will depend on the desired index which may vary from 70–120 and can be easily calculated by those skilled in the art from a selected polyisocyanate and polyol composition. A further advantage of the use of the polyisocyanate composition (a) and the polyol composition (b) is that in order to operate at an index of 70–120 the relative amounts of the compositions do not differ too much, which allows for easy metering and mixing of the compositions. One-shot, prepolymer or quasi-prepolymer processes can be used. The flexible foams prepared according to the present invention have a free rise density of 15–50 kg/m$^3$ (ISO 845) especially 20–35 kg/m$^3$ and may be used in mattresses, cushions, furniture seating and automotive seating and especially in automotive seat-backs.

EXAMPLES

The following examples are provided to illustrate the invention and should not be construed as limiting thereof

Examples 1–2

Polyol compositions were made by mixing all ingredients indicated in the Table below except the polyisocyanate (all amounts are in parts by weight). The polyol compositions were mixed with the indicated amount of polyisocyanate and allowed to react in a bucket. The properties of the foams obtained were as indicated in the Table below:

| Example | 1 | 2 |
|---|---|---|
| Polyol 1 | 95 | 85 |
| Polyol 2 | — | 10 |
| Polyol 3 | 5 | 5 |
| D33LV | 0.3 | |
| D8154 | 0.7 | |
| B4113 | ← 0.6 → | |
| Niax A1 | 0.1 | |
| Water | 3.5 | |
| MI50 | 50 | 50 |
| Isocyanate index | 88 | 87 |
| String time (s) | 62 | 53 |
| End of rise time (s) | 98 | 89 |
| Free rise density (kg/m$^3$) | 32.7 | 32.0 |
| Compression load deflection (kPa, 40%) | 1.5 | 1.5 |
| Hysteresis Loss (%) | 28.2 | 28.2 |

Glossary of raw materials used:
Polyol 1: polyoxyethylene polyoxypropylene polyol having a nominal functionality of 3, an EO content of 15% by weight (all tipped) and an OH value of 28 mg KOH/g.
Polyol 2: DALTOCEL ™ F417 polyol, a PIPA polyol comprising 20% by weight of particulate material, obtainable from Huntsman Polyurethanes (DALTOCEL is a trademark of Huntsman International LLC)
Polyol 3: an ethoxylated glycerol having an OH value of 127 mg KOH/g.
MI50: MDI diisocyanate with 50% w of 2,2' + 2,4'-isomer.
D33LV: amine catalysts, available from Air Products.
D8154: amine catalyst, available from Air Products.
Niax A1: amine catalyst, available from Osi Chemicals.
B4113: silicone surfactant, available from Goldschmidt.

Examples 3–9

Examples 1–2 were repeated with the following ingredients and amounts. The foams had the following properties:

| Examples | 3 | 4 | 5 | 6 | 7 | 8 | 9 |
|---|---|---|---|---|---|---|---|
| Polyol 1 | — | — | — | — | 75 | 55 | — |
| Polyol 4 | 95 | 95 | — | — | — | — | — |
| Polyol 5 | — | — | 95 | 95 | 20 | 40 | 90 |
| Polyol 3 | 5 | 5 | 5 | 5 | 5 | 5 | 10 |
| D33LV | 0.3 | 0.3 | 0.3 | 0.3 | 0.3 | 0.3 | 0.3 |
| D8154 | 0.7 | 0.7 | 0.7 | 0.7 | 0.7 | 0.7 | 0.7 |
| B4113 | 1.2 | 1.2 | 1.0 | 1.0 | 1.0 | 1.0 | 1.0 |
| Niax A1 | 0.1 | 0.1 | 0.1 | 0.1 | 0.1 | 0.1 | 0.1 |
| water | 4 | 5 | 4 | 5 | 4 | 4 | 4 |
| MI50 | 55 | — | 55 | — | 55 | 55 | 55 |
| Polyisocyanate 2 | — | 70 | — | 70 | — | — | — |
| Isocyanate INDEX | 85 | 89 | 86 | 89 | 86 | 86 | 84 |
| Free rise density, kg/m$^3$ | 27 | 25 | 28 | 26 | 30 | 29 | 28 |
| Compression load deflection (kPa, 40%) | 1.3 | 1.5 | 1.5 | 1.7 | 1.4 | 1.4 | 0.9 |
| Hysteresis Loss, % | 23.3 | 25.2 | 27.9 | 28.0 | 28.8 | 28.3 | 24 |
| Tear Max (N/m) | 276 | 224 | 199 | 181 | 294 | 308 | 152 |
| Elongation (%) | 180 | 118 | 119 | 86 | 135 | 141 | 84 |

Glossary of raw materials used:
Polyol 4: a pentaerythritol-initiated polyoxyethylene polyoxypropylene polyol with 14% EO (all capped) and having an nominal equivalent weight of 1870 and an OH value of 30 mg KOH/g.
Polyol 5: a sorbitol-initiated polyoxyethylene polyoxypropylene polyol with 15% EO (all capped) and having a nominal equivalent weight of 2080 and an OH value of 27 mg KOH/g.
Polyisocyanate 2: is a 90/10 w/w mixture of MI50 and a polymeric MDI having an NCO value of 30.7% by weight and comprising about 38% by weight of diisocyanate, the remainder being homologues having an isocyanate functionality of 3 or more; the amount of 2,4'- and 2,2'-MDI together is 6% by weight calculated on the diisocyanates.

The foams had nice open cells and showed little or no recession, a high resilience and a low compression set. The physical properties in all above examples have been measured as follows:

free rise density: ISO 845 compression load deflection: ISO 3386/1 hysteresis loss: ISO 3386/1 tear max: ISO 8067 elongation: ISO 1798

Example 10

From the formulation of Example 1 of WO 98/42763 (application PCT/EP98/0867), a free rise foam (hand-mix) was made. The catalyst levels were slightly adjusted since the reaction was too fast for hand-mixing. When the TDI was replaced by MI 50 (weight for weight) the foam collapsed. When the diiusocyanate in the prepolymer was replaced by MI50 (weight for weight) the foam collapsed as well.

What is claimed is:

1. A process for preparing a free rise or slabstock flexible polyurethane foam with a free rise density of 20 to 35 kg/m$^3$ and a high resilience at an NCO index of 70–120 by reacting:
   (a) a polyisocyanate composition having an isocyanate functionality below 2.15 and consisting of diphenylmethane diisocyanate and optionally homologues thereof having an isocyanate functionality of 3 or more, the amount of diphenylmethane diisocyanate being 81 to 100% by weight calculated on the amount of diphenylmethane diisocyanates and homologues, and the diphenylmethane diisocyanate comprising 40–60% by weight, calculated on the weight of diphenylmethane diisocyanate, of diphenylmethane diisocyanate containing at least one NCO group in the ortho position, and the amount of homologues having an isocyanate functionality of 3 or more being 19–0% by weight, and
   (b) a polyol composition comprising:
      (i) a polyoxyethylene-polyoxypropylene-polyol, having an average nominal hydroxyl functionality of 2–8, an average equivalent weight of 1000–4000 and containing 10–25% by weight of oxyethylene groups;
      (ii) 3 to 8 parts by weight of water as the sole blowing agent or optionally together with $CO_2$ as the sole blowing agents; and
      (iii) 2 to 20 parts by weight of a polyether polyol having an average nominal hydroxyl functionality of 2–6, an average equivalent weight of 200–600 and containing at least 60% by weight of oxyethylene groups; and optionally
      (iv) up to 30 parts by weight of particulate material which is dispersed in said polyol composition; the amounts of (b)(ii) to (b)(iv) being calculated per 100 parts by weight of (b)(i); and optionally
      (v) auxiliaries and additives.

2. The process of claim 1, wherein the amount of water is 4 to 8 parts by weight and the average nominal hydroxyl functionality of polyol (b)(i) is 2 to 6.

3. The process of claim 1, wherein the polyether polyol (b)(iii) is a polyoxyethylene polyol having an equivalent weight of 200 to 500.

4. The process of claim 2, wherein the polyether polyol (b)(iii) is a polyoxyethylene polyol having an equivalent weight of 200 to 500.

5. The process of claim 1, wherein the particulate material is selected from the group consisting of:
   (a) the reaction product of a polyisocyanate and a compound having: (i) a plurality of hydroxyl, primary amine, and secondary amine groups, and (ii) an equivalent weight of up to 400, and
   (b) the reaction product of triethanolamine and diphenylmethane diisocyanate optionally comprising homologues thereof having an isocyanate functionality of 3 or more.

6. The process of claim 2, wherein the particulate material is selected from the group consisting of:
   (a) the reaction product of a polyisocyanate and a compound having: (i) a plurality of hydroxyl, primary amine, and secondary amine groups, and (ii) an equivalent weight of up to 400, and
   (b) the reaction product of triethanolamine and diphenylmethane diisocyanate optionally comprising homologues thereof having an isocyanate functionality of 3 or more.

7. The process of claim 3, wherein the particulate material is selected from the group consisting of:
   (a) the reaction product of a polyisocyanate and a compound having: (i) a plurality of hydroxyl, primary amine, and secondary amine groups, and (ii) an equivalent weight of up to 400, and
   (b) the reaction product of triethanolamine and diphenylmethane diisocyanate optionally comprising homologues thereof having an isocyanate functionality of 3 or more.

8. The process of claim 4, wherein the particulate material is selected from the group consisting of:
   (a) the reaction product of a polyisocyanate and a compound having: (i) a plurality of hydroxyl, primary amine, and secondary amine groups, and (ii) an equivalent weight of up to 400, and (b) the reaction product of triethanolamine and diphenylmethane diisocyanate optionally comprising homologues thereof having an isocyanate functionality of 3 or more.

9. The process of claim 1, wherein the functionality of the polyisocyanate is less than 2.08.

10. The process of claim 2, wherein the functionality of the polyisocyanate is less than 2.08.

11. The process of claim 3, wherein the functionality of the polyisocyanate is less than 2.08.

12. The process of claim 4, wherein the functionality of the polyisocyanate is less than 2.08.

13. The process of claim 5, wherein the functionality of the polyisacyanate is less than 2.08.

14. The process of claim 6, wherein the functionality of the polyisocyanate is less than 2.08.

15. The process of claim 7, wherein the functionality of the polyisocyanate is less than 2.08.

16. The process of claim 8, wherein the functionality of the polyisocyanate is less than 2.08.

17. The process of claim 1, wherein the polyether polyol (b)(iii) is present in an amount from 2 to 10 parts by weight.

18. The process of claim 1, wherein the particulate material (b)(iv) is present in an amount from 2 to 25 parts by weight.

* * * * *